United States Patent [19]

Boahen et al.

[11] Patent Number: 5,206,541
[45] Date of Patent: Apr. 27, 1993

[54] CURRENT-MODE BASED ANALOG CIRCUITS FOR SYNTHETIC NEURAL SYSTEMS

[75] Inventors: Kwabena A. Boahen, Pasadena, Calif.; Andreas G. Andreou, Baltimore, Md.; Philippe O. Pouliquen, Potomac, Md.; Robert E. Jenkins, Laurel, Md.

[73] Assignee: The Johns Hopkins University, Baltimore, Md.

[21] Appl. No.: 693,310

[22] Filed: Apr. 30, 1991

[51] Int. Cl.$^5$ .............................................. G06G 7/12
[52] U.S. Cl. ................................... 307/201; 307/494; 395/21
[58] Field of Search ............... 307/201, 448, 491, 494, 307/270; 364/513; 395/21

[56] References Cited

U.S. PATENT DOCUMENTS

| | | | |
|---|---|---|---|
| 3,471,712 | 10/1969 | Tomozawa et al. | 307/448 |
| 4,874,963 | 10/1989 | Alspector | 307/201 |
| 4,950,917 | 8/1990 | Holler et al. | 307/201 |
| 5,040,134 | 8/1991 | Park | 364/513 X |
| 5,059,814 | 10/1991 | Mead et al. | 307/201 |

OTHER PUBLICATIONS

Andreou, A. G., et al, "Current-Mode Subthreshold MOS Circuits for Analog VLSI Neural Systems", Mar. 1991, IEEE Trans. Neural Networks.

Cohen, M. H. et al, "Silicon VLSI Implementation of an Auto-Adaptive Network for the Real-Time Separation of Independent Signal Sources", Mar. 21, 1991, Proceedings 25th Annual Conference on Information Sciences & Systems.

Boahen, K. A., et al, "A Heteroassociative Memory Using Current-Mode MOS Analog VLSI Circuits", May 1989, IEEE Trans. Circuits and Systems.

Andreou, A. G., et al, "Synthetic Neural Circuits Using Current-Domain Signal Representations", 1989, Neural Computation.

*Primary Examiner*—David R. Hudspeth
*Attorney, Agent, or Firm*—Francis A. Cooch

[57] ABSTRACT

A two transistor current-controlled current conveyor (C4) circuit is provided which exploits the translinear properties of the MOS transistor in subthreshold and uses unidirectional current signals. As a result, the circuits of the invention achieve high functionality and integration density with very low power dissipation. Two C4 circuits connected to and communicating through a bidirectional junction circuit of the invention permit the transmission of independent, bidirectional signals. These circuits are useful for implementing synthetic neural systems such as associative memories and silicon retinas, such as winner-takes-all and pyramidal neuron circuits and the outer-plexiform layer of a retina.

8 Claims, 7 Drawing Sheets

CURRENT-MODE BASED ANALOG CIRCUITS FOR SYNTHETIC NEURAL SYSTEMS

STATEMENT OF GOVERNMENTAL INTEREST

This invention was made with Government support under contract N00039-89-C-5301 awarded by the U.S. Navy Department. The Government has certain rights in this invention.

BACKGROUND OF THE INVENTION

Biological information processing systems are compact, energy efficient, and excel at solving difficult problems in sensory perception and complex motor control in a massively parallel fashion using slow, imprecise hardware. Thus, it is not surprising that computer scientists and engineers in their quest to endow present-day computers with perceptual processing capabilities are studying the organization and physics of computation in the nervous system.

In recent years, researchers have used knowledge about the physics of information processing in the nervous system, and about its organization, to engineer synthetic sensory processing systems (see, e.g., U.S. Pat. Nos. 4,962,342; 4,786,818; and 4,771,196). Power dissipation, area efficiency, and interconnects are the main engineering constraints in these types of systems. Precision in computation and speed are of secondary importance.

Analog very large scale integration (VLSI) is a novel and promising approach to engineering large-scale synthetic sensory computing systems that feature distributed processing and local connectivity with robust performance in the presence of hardware faults. In such systems, the physical laws that govern the cooperative behavior of many simple processing elements are exploited to process information.

At the analog VLSI system level, global properties such as energy are used to solve problems. Koch's "smart vision chips" employ resistive networks that converge to a state of minimum power dissipation to solve ill-posed problems in computer vision (C. Koch, "Seeing Chips: Analog VLSI Circuits for Computer Vision", *Neural Computation*, vol. 1, no. 2, pp. 184–200, 1989). Sivilotti's implementation of Hopfield's associative memory (M. A. Sivilotti, M. R. Emerling, and C. A. Mead, "VLSI Architectures for Implementation of Neural Networks", *Neural Networks for Computing*J. S. Denker ed., AIP Conference Proceedings 151, pp. 408–413, 986) uses the stable states of a dynamical system to represent information; associative recall occurs as the system converges to its local energy minima.

The above approach to Analog VLSI implementation of biological information processing systems has been adopted by C. A. Mead and his coworkers at Caltech. Their design methodology is based on the transconductance amplifier and utilizes differential voltage signal representations (C. A. Mead, *Analog VLSI and Neural Systems*, Reading, Mass., Addison-Wesley, 1989).

The approach of the invention described and claimed herein is more minimalistic than the just described processes, emphasizing design at the transistor level. High functionality and integration density are achieved by using unidirectional current signals and Current-Mode (CM) subthreshold metal oxide semiconductor (MOS) circuits. The use of complex building blocks, e.g., transconductance amplifiers, and of differential voltage signals is thereby avoided. The necessary ingredients of the CM approach to analog VLSI neural systems design are described below.

Subthreshold complementary MOS (CMOS) technology has long been recognized as the technology of choice for implementing micropower digital and analog LSI circuits. It offers the same advantages for the implementation of synthetic neural systems: high integration density, low power dissipation, and useful parasitic bipolar devices. In addition, it is easily accessible to engineers and scientists through silicon foundry services such as MOSIS.

Subthreshold currents are comparable to ionic currents in cell membranes; they range from a few picoamps to a few micro-amps. There is also a direct analogy between the device physics of voltage-gated ionic channels in excitable membranes and that of the MOS transistor in subthreshold region. Their operation is based on Boltzmann's Law and thus both exhibit the same exponential current dependence on voltage; this dependence is sometimes steeper in ionic channels because of correlated charge control. Thus, a one to one mapping of ensembles of gated channels to a single MOS transistor can be made.

For an n-type MOS transistor, the subthreshold current is given by:

$$I_{ds} = I_o\, e^{\frac{(1-\kappa)V_{bs}}{V_T}}\, e^{\frac{\kappa V_{gs}}{V_T}} \left(1 - e^{-\frac{V_{ds}}{V_T}} + \frac{V_{ds}}{V_o}\right) \qquad (1)$$

where $V_{gs}$ is the gate-to-source potential, $V_{ds}$ is the drain-to-source potential, $V_{bs}$ is the substrate (or well)-to-source potential (body effect), $I_o$ is the zero-bias current for the given device, $V_T = kT/q$, is the thermal voltage (26 mV at room temperature), $V_o$ is the Early voltage (which is proportional to the channel length), and $\kappa$ measures the effectiveness of the gate potential in controlling the channel current. All potentials are measured with respect to the source potential and are sign reversed for a p-type device. Typical parameters for minimum-size devices (4μm × 4μm) fabricated in a standard digital 2μm n-well process are: $I_o = 0.72 \times 10^{-18}$A, $\kappa = 0.75$ and $V_o = 15.0$V. Thus, the current changes by a factor of 10 for an 80 mV change in $V_{gs}$ or a 240 mV change in $V_{bs}$ (up to about 100 nA, which is the limit of the subthreshold region). The above model matches experimental data reasonably well and is adequate for design simulations.

For devices in saturation (that is $V_{ds} \geq 4V_T$), neglecting the early effect and the body effect, $$I_{ds} = I_o e^{\kappa V_{gs}/V_T}. \qquad (2)$$

This simplified equation (eq.), containing only the dependence on $V_{gs}$, is sufficient for most circuit designs. On the other hand, eq. (1) shows an explicit $V_{bs}$ dependence that underlies the role of the substrate as another terminal which can control the drain-source current.

In the saturation region, the MOS transistor is a voltage-controlled current source with output conductance:

$$g_{dsat} = \frac{\partial I_{ds}}{\partial V_{ds}} = \frac{I_{ds}}{V_o}. \qquad (3)$$

The transconductance, $g_m$, of the device is given by:

$$g_m = \frac{\partial I_{ds}}{\partial V_{gs}} = \frac{\kappa I_{ds}}{V_T}. \qquad (4)$$

Figure 1A:
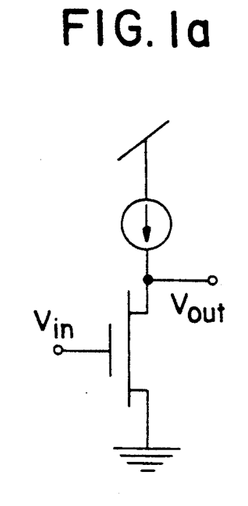
FIGS. 1a, 1b, and 1c illustrate the three modes of operation of a transistor.

High functionality is obtained by using the MOS transistor itself to perform as many functions as possible in the same circuit:

In the common-source mode, it is an inverting amplifier with high voltage gain: $A_v = g_m/g_{dsat}$ (FIG. 1a). For our process $A_v = \kappa V_o/V_T \approx 430$.

Figure 1B:
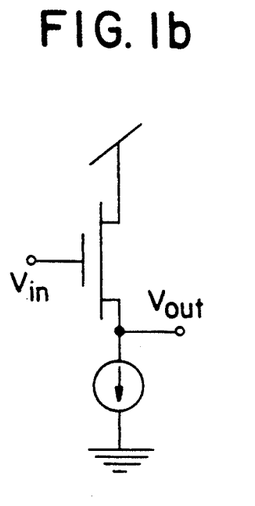

In the common-drain mode, it is a voltage follower with low output resistance: $1/g_m$ (FIG. 1b).

Figure 1C:
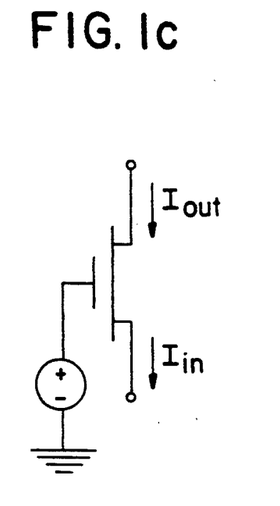

In the common-gate mode, it is a current buffer with low output conductance: $g_{dsat}$ (FIG. 1c).

In silicon integrated circuits, non-uniform substrate doping produces random variations in the drain current, while the nonzero drain conductance results in systematic variations.

Traditional analog integrated circuits depend on good matching between components. Therefore, large devices operating above threshold are used to reduce mismatch to very low levels. In contrast, to achieve VLSI densities, transistors that have small geometries, typically (4 μm × 4 μm), must be employed. This together with their operation in the subthreshold region, makes the drain current strongly dependent on variations of fabrication process parameters, in particular $I_o$. Characterization of the fabrication process and the matching properties of the basic devices is thus of paramount importance because it provides the necessary information for designing working systems.

Large, dense transistor arrays in the subthreshold region of operation have now been characterized. More than 150,000 transistors have been tested using an automated data acquisition system. Measurements, established three factors affecting matching: edge effects, striation effects, and random variations.

The edge effect manifests itself as a dependence of the transistor current on its position with respect to the surrounding structures. N-type transistors surrounded by other n-type transistors have a larger drain current than identically designed and biased transistors on the edges of the arrays. The opposite is true for p-type transistors. Variations in transistor currents caused by the edge effect typically range from 5% to 15% for n-type transistors and from 20% to 50% for p-type transistors.

The striation effect exhibits itself as a sinusoidal spatial variation in transistor current. The amplitude is about 30% of the average current and the spatial period varies slowly from 100 μm to 200 μm for p-type devices in the p-well process.

Figure 2:
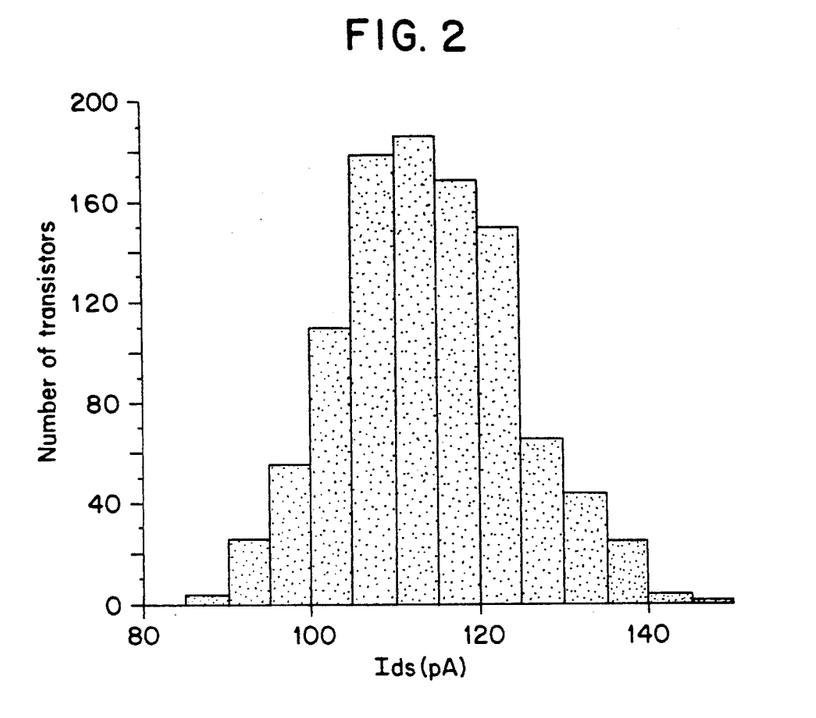
FIG. 2 is a histogram for the subthreshold current of 1024 n-channel MOS FET's fabricated in an n-well process.
Figure 3:
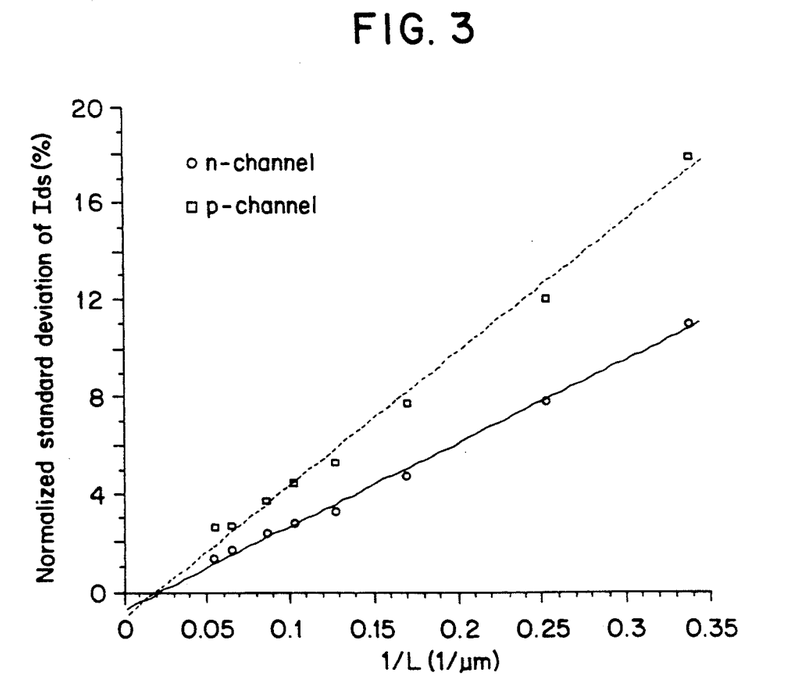
FIG. 3 is a graph illustrating dependence of normalized standard deviation of subthreshold drain current on transistor size.

The random variation of subthreshold current follows a Gaussian distribution (FIG. 2). FIG. 3 shows the dependence of normalized standard deviation of subthreshold current on transistor size. Each data point represents measurements from approximately 1000 transistors. The standard deviation of the current is proportional to the current and inversely proportional to the length of square devices (i.e., devices whose length and width are the same):

$$\sigma_I = \sigma_O \frac{I_{ds}}{L} \qquad (5)$$

where $\sigma_o$ is the proportionality constant for the given device type, $I_{ds}$ is the nominal device current, and L is the length of the device (square geometry).

Edge effects and striation effects present significant problems in large-scale analog computational systems, since they cannot be reduced by increasing transistor area. The striation effect is especially damaging, since the orientation of the striations is not known a priori. The edge effect can be canceled by symmetrical placement of transistors.

At the system level, random variations are addressed by distributing computations over a large number of elements. The normalized standard deviation of the currents from matched current sources can be reduced by a factor of $\sqrt{N}$ by using N small devices for each current source. Furthermore, N small devices can be positioned in a way that minimizes the edge and striation effects. Finally, this distribution of the signal over many devices permits implementation of parallel computation. Thus, such systems are carefully designed to simultaneously perform parallel distributed processing and reduce matching problems.

At the circuit level, the transistors are biased at a constant $I_{ds}$ rather than a constant $V_{gs}$. This is so because the variability of $I_0$ is much larger than the variability of $\kappa$. Biasing at a constant current and thinking in terms of current-domain signals is the essence of the Current-Mode (CM) approach in circuit design.

There has been a renewed interest in CM circuits (Papers on Current-Mode circuits, B. Gilbert chair, *Proceedings ISCAS-89*, pp. 1567–1595, May 1989). A CM circuit is one whose input signals and output signals are currents; voltages play only an incidental role. The simplest CM circuit is the current mirror.

At the circuit level, conservation of charge (Kirchoff's Current Law (KCL)); conservation of energy (Kirchoff's Voltage Law (KCL)); and the device physics of active devices can be exploited to implement powerful computational primitives. Current signals may be summed simply by bringing them to the same node. Voltage signals may be summed around a loop.

The Translinear Principle can be used to synthesize a wide variety of circuits to perform both linear and nonlinear operations on the current inputs, including products, quotients, and power terms with fixed exponents (see, e.g., B. Gilbert, "A Monolithic 16-Channel Analog Array Normalizer", *IEEE Journ. of Solid-State Circuits*, vol. SC-19, No. 6, pp. 956–963, 1984). The translinear principle can be stated as follows:

In a closed loop containing an equal number of oppositely connected translinear elements, the product of the current densities in the elements connected in one direction is equal to the corresponding product for elements connected in the opposite direction.

Translinear circuits (see, e.g., U.S. Pat. No. 3,582,689), traditionally built using bipolar transistors, are a computationally powerful subclass of CM circuits. A translinear circuit is defined as one whose operation depends on a linear relationship between transconductance and channel current in the active device. Such a circuit relies on KVL and on the exponential dependence of drain current on the gate voltage in the MOS transistor (Boltzmann's Law). Explicit use of differential voltage signals (not referenced to ground) is avoided. The MOS transistor is a translinear element when operated in the subthreshold region (see eq. (4)); the absence of a base current makes it an ideal one. The current mirror in subthreshold operation is a trivial example of a translinear circuit.

Figure 4:
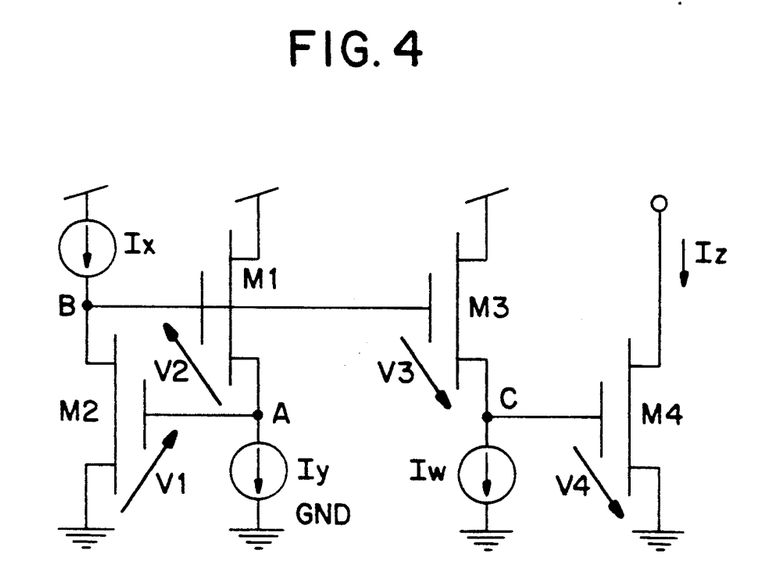
FIG. 4 illustrates a simple MOS translinear circuit which performs a normal product computation.

The silicon optical motion detector (A. G. Andreou and K. Strohbehn, "Analog VLSI implementations of the Hassenstein-Reichardt-Poggio models for vision computation," in Proc. 1990 IEEE Symp. Systems, Man and Cybernetics (Los Angeles, Ca.), Nov. 1990.) uses the MOS translinear multiplier/divider in FIG. 4 to compute the correlation $I_z$ between two signals, $I_x$ and $I_y$. By applying the translinear principle around the loop indicated by the arrows, we find $$I_w I_z = I_x I_y, \quad I_z = \frac{I_x I_y}{I_w} \tag{6}$$

where $I_w$ normalizes the result.

The above relation can also be derived by summing the voltages around the loop GND-A-B-C-GND (conservation of energy):

$$V_1 + V_2 + V_3 + V_4 = 0.$$

Replacing the gate-source voltages for $M_1$, $M_2$, $M_3$, and $M_4$ with their respective drain-source currents through eq. (2) and assuming the same $\kappa$ and $I_o$ for all devices, we obtain $$\frac{V_T}{\kappa} \ln\left(\frac{I_x}{I_o}\right) + \frac{V_T}{\kappa} \ln\left(\frac{I_y}{I_o}\right) - \frac{V_T}{\kappa} \ln\left(\frac{I_w}{I_o}\right) - \tag{7}$$

$$\frac{V_T}{\kappa} \ln\left(\frac{I_z}{I_o}\right) = 0$$

$$\ln\left(\frac{I_x I_y}{I_o}\right) = \ln\left(\frac{I_z I_w}{I_o}\right) \tag{8}$$

from which eq. (6) readily follows.

Yet another way of looking at the function of the circuit in FIG. 4 is a log-antilog block. Transistor $M_1$ does the log-ing and $M_4$ the antilog-ing. The other two transistors serve as voltage level shifters; this is equivalent to normalization in the current domain.

The translinear property of subthreshold MOS transistors is also useful for analyzing the dynamics (temporal response) of large-scale collective computational systems and for simplifying circuit synthesis and analysis. Unlike traditional analog design, optimizing circuits by careful sizing of the devices is not necessary. This is because the transconductance is determined by the current signals and does not depend on the geometry of the devices. Longer channels are used to avoid the Early effect and large devices are employed in a few critical parts of the system to improve accuracy in the computation (current matching).

A current conveyor is an ingenious translinear, hybrid voltage/current three-port device. It is a versatile building block for analog signal processing applications designed to replace the operational amplifier.

Figure 5A:
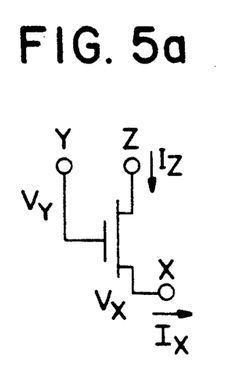
FIGS. 5a and 5b, illustrate a single transistor current conveyor circuit and N single-transistor current conveyors interacting through a single line, respectively.

Although its original implementation (see U.S. Pat. No. 3,582,689) used five bipolar transistors, the current conveyor can perhaps be most easily explained by considering a single device. A transistor can transfer a current from a high-conductance to a low-conductance node (see FIG. 1c) or a voltage from a high-impedance to a low-impedance node (see FIG. 1b). These two characteristics can be exploited simultaneously (see FIG. 5a) such that the device acts as a voltage follower (node X will follow voltage changes at node Y) and conveys the current at X to the low-conductance node Z. This dual role, obtained in this case using only a single transistor, captures the essence of the current conveyor.

Figure 5B:
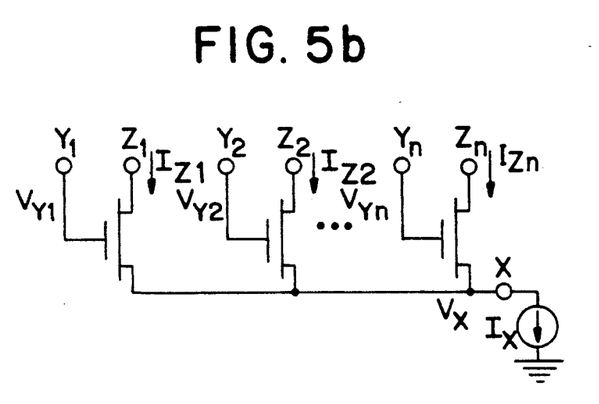

Current conveyors can easily interact with one another as shown in FIG. 5b. Here, node X follows the greatest input voltage $V_{yi}$, turning off all other current conveyors. The tail current, $I_x$, is then entirely conveyed to the output node $Z_i$ identifying the ith input voltage as being the greatest.

The circuits described and claimed herein build on the current conveyor to achieve even higher functionality and integration density while avoiding the use of complex components and differential voltage signals. These circuits are faster, generate less heat, are more reliable, and use less area than prior art devices.

SUMMARY OF THE INVENTION

The invention consists of simple and useful circuits for implementing synthetic neural systems. A current-controlled current conveyor is described which consists of two transistors, a first transistor which has a node for a first current and whose gate is connected to a control current. The second transistor has a node for the control current and its gate is connected to the first current. Under this arrangement, the first current is conveyed to a supply node by the first transistor and the control current determines the voltage at the node of the first transistor.

The second circuit of the invention is a bidirectional junction circuit again consisting of two transistors. Both transistors are connected to ground with the first transistor connected to a first node at which a first voltage is applied and whose gate is connected to a second voltage. The second transistor is connected to a second node at which the second voltage is applied and whose gate is connected to the first voltage This design transforms the first voltage into a first current at the second transistor and the second voltage into a second current at the first transistor.

Either or both of the above-described basic circuits can be used to build more complex circuits to perform biological processing. Such complex circuits described and claimed herein include a winner-takes-all circuit; a pyramidal neuron circuit; and a circuit simulating the outer-plexiform layer of a retina.

These circuits use voltage to represent a neuron's output signal, and current to represent its inputs signals. Since currents and voltages may be independently transmitted along the same line, these signal representations allow a neuron's output and inputs to be communicated using just one line. Voltage output facilitates fan-out while current input provides summation. Thus, in close analogy to actual neuronal microcircuits, the output signal is generated at the same node where inputs are integrated.

For more complete appreciation of the invention, attention is invited to the following detailed description of a preferred embodiment of the invention taken with the figures of the drawings. The scope of the invention, however, is limited only through the claims appended hereto.

DETAILED DESCRIPTION OF THE PREFERRED EMBODIMENT

Figure 6A:
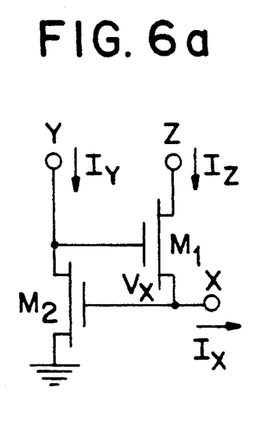
FIGS. 6a and 6b, illustrate the two-transistor current controlled current conveyor (C4) of the invention and a C4 application, respectively.

One embodiment of the invention is a two transistor current-controlled current conveyor (C4) circuit, shown in FIG. 6a, which acts as a neuron in the circuits to be described later. As with the standard current conveyor, the current-controlled current conveyor has a communication node X, a control node Y, and a supply node Z. First current, $I_x$, supplied to node X (source) is conveyed to node Z (drain) by first transistor $M_1$. However, the voltage at node X is determined by the control current $I_Y$ which is introduced at node Y (drain) of second transistor $M_2$. This is accomplished by connecting $I_Y$ to the gate of $M_1$ and using $M_1$ as a voltage follower and by connecting $I_x$ to the gate of $M_2$ to provide feedback through $M_2$ which functions as an inverting amplifier. As a result, $M_1$ adjusts the voltage at node X so that the current in $M_2$ equals $I_Y$. The conductance seen at X is approximately $g_{m1}g_{m2}/g_{dsat2}$; it is increased by a factor equal to the gain provided by $M_2$.

Thus, the current-controlled current conveyor's operation can be described by two simple relationships:

$$I_z = I_x g(V_x) = I_Y \quad (9)$$

where the g( ) is the function that relates the output $V_x$ to the control current $I_y$. For subthreshold operation this function is the logarithm but it continuously transforms into a square root as the current increases and the device operates above threshold.

When node Z is connected to the power supply, the two-transistor current-controlled current conveyor is the simplest form of a trans-resistance amplifier—a single transistor is the simplest form of a transconductance amplifier.

Figure 6B:
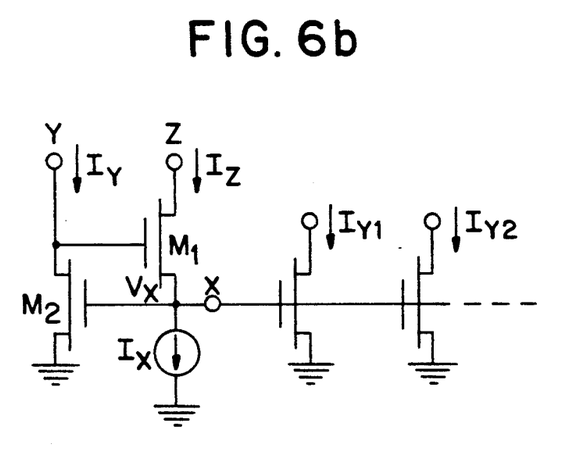

At the system level it is important to note that, by using transistors identical to $M_2$, we can mirror the control current $I_y$ by collecting their gates to node X (see FIG. 6b). This facilitates fan-out, i.e., distribution of an output signal (current) in the form of a voltage, as well as fan-in, i.e., the aggregation of input signals which are currents; both can be done simultaneously over a single physical line.

In a neuronal circuit, the interaction between neurons is mediated by specialized structures called synapses. A neuron receives its inputs from other neurons through synaptic junctions which may have different efficacies. In a typical VLSI system, the synapses are implemented as a two-dimensional array with the neurons on the periphery. This is because $O(N^2)$ synapses are required in a network with N neurons.

Figure 7A:
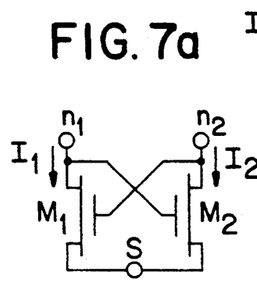
FIGS. 7a and 7b, illustrate a bidirectional junction circuit of the invention and a combined circuit consisting of two C4 circuits connected to and communicating through a bidirectional junction circuit, respectively.

The two transistor synapse (bidirectional junction) circuit (FIG. 7a) is another embodiment of the invention herein. It provides bidirectional interaction between synthetic neurons (current-controlled current conveyors) connected to first node $n_1$ and second node $n_2$ (as in FIG. 7b). Each node receives a voltage input and produces a current at the other node; each transistor behaves like a synaptic junction. Interaction is turned on by grounding S, turned off by pulling S up to $V_{dd}$ (power supply).

When S is at ground, first and second voltages applied to nodes $n_1$ and $n_2$, respectively, are transformed into first and second currents by the transconductances of second transistor $M_2$ and first transistor $M_1$, respectively (because as shown in FIG. 7, the gate of $M_1$ is connected to the second voltage at $n_2$ and the gate of $M_2$ is connected to the first voltage at $n_1$). If these voltages exceed $V_{dsat}$, the transistors are in saturation and act as current sources. Also, changes in the voltage at $n_1(n_s)$ do not affect the current in $M_1(M_2)$. Actually, for a small change in $V_{n1}$, the changes in $I_1$ and $I_2$ are related by:

$$\frac{\Delta I_1}{I_1} = \frac{g_{dsat1}}{g_{m2}} = \frac{1}{A} \frac{\Delta I_2}{I_2} \quad (10)$$

where the gain A = 430 for typical technology. Hence, we can double $I_2$ (using the voltage at $n_1$) while disturbing $I_1$ by only 0.23%. A similar relationship holds for a small change in $V_{n2}$.

If the interaction is turned off (S is at $V_{dd}$) and $V_{n1}$ is greater than $V_{n2}$, $M_1$ is shut off, and $M_2$ sources the current:

$$I_{off} = I_o e^{\kappa(v_{n1} - v_{n2})/V_T} = I_o \epsilon. \quad (11)$$

Thus, the current leakage $I_{off}$ is proportional to $\epsilon$, the dynamic range of the current signals. For signals in the range of 100 pA to 100 nA, for instance, $\epsilon = 10^3$, and $I_{off} = 1$ fA in the worst case.

Figure 7B:
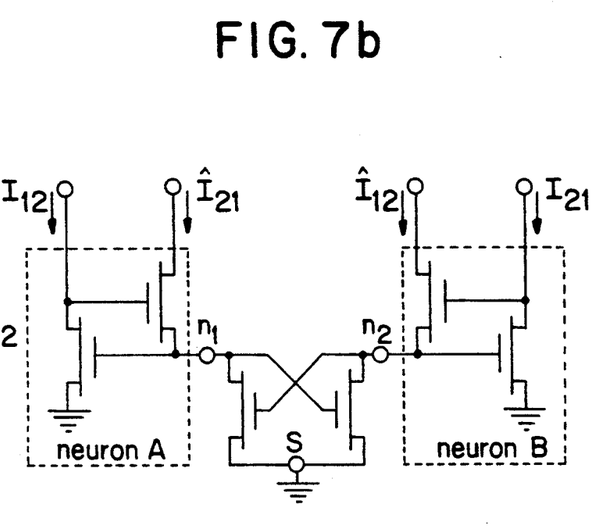

A combined C4-bidirectional junction MOS translinear circuit and experimental data therefor are shown in FIGS. 7b and 8, respectively. FIG. 7b illustrates two C4 circuits communicating through a bidirectional junction circuit. Synthetic neuron B (on the right in FIG. 7b) receives the current signal $I_{12}$ from neuron A as $\hat{I}_{21}$. Simultaneously, synthetic neuron A receives the current signal $I_{21}$ from neuron B as $\hat{I}_{21}$. Small changes in the current signal $I_{12}$ causes slight changes in the received current $\hat{I}_{21}$. These variations are related by $$\frac{\Delta \hat{I}_{21}}{I_{21}} = \frac{g_{dsat}}{g_m} = \frac{1}{A} \frac{\hat{I}_{21}}{I_{21}} \quad (12)$$

as before. Hence, bidirectional communication is possible with less than $-50$ dB cross-talk.

If the two transistors forming the bidirectional junction are fabricated in an isolated well, the well voltage can be used to modulate the interaction between neurons in a multiplicative fashion by applying an analog signal to the well. The circuit of FIG. 7b was fabricated in a standard, 2 $\mu$m p-well CMOS process using 4 $\mu$m $\times$ 4 $\mu$m transistors. Experimental data, including the modulation of the well voltage ($V_{bs}$), are shown in FIG. 8.

Figure 8A:
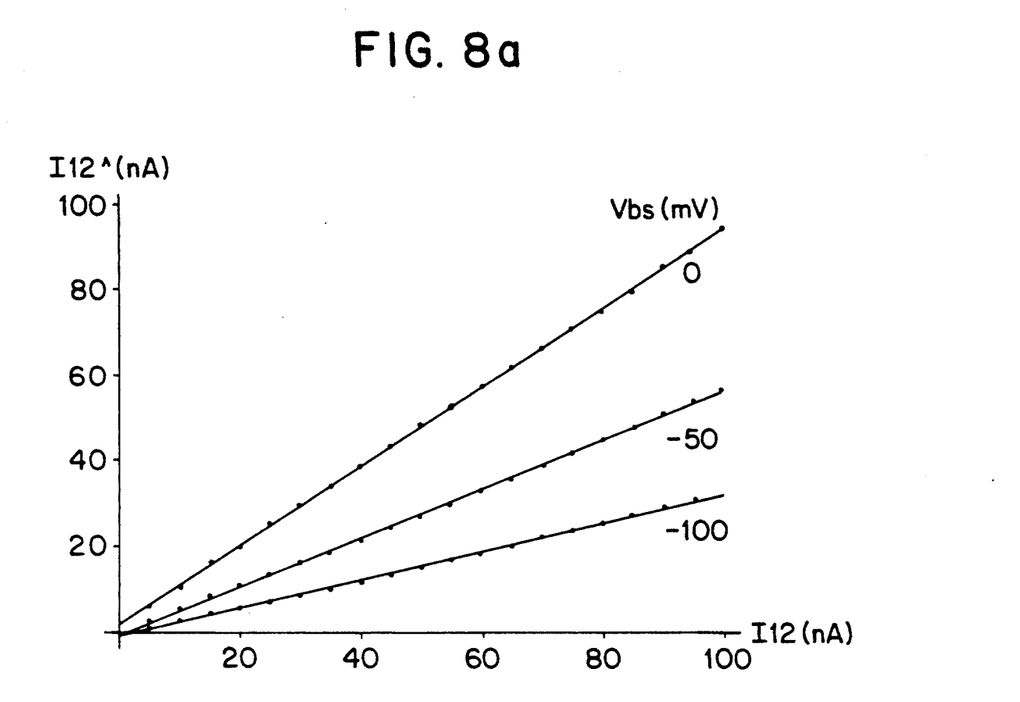
FIGS. 8a and 8b, are graphs illustrating experimental data for a combined C4-bidirectional junction circuit.
Figure 8B:
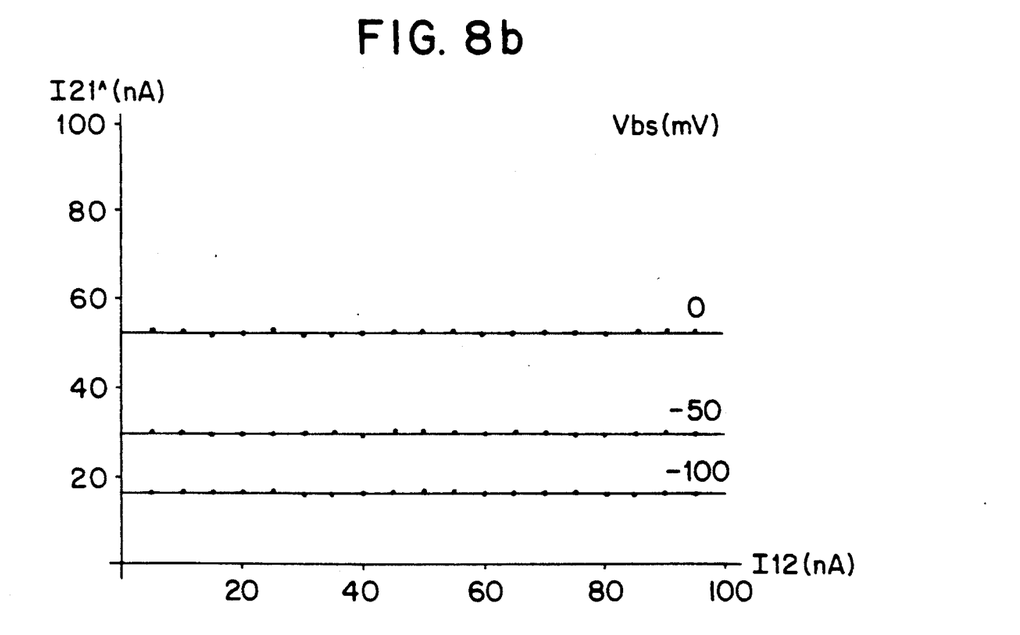

As $I_{12}$ is stepped from 5.0 nA to 100 nA with $I_{21}$ held at 50 nA, $\hat{I}_{12}$ varies as shown in the plot in FIG. 8a. For well voltages $V_{bs}=0, -50,$ and $-100$ mV, $\hat{I}_{12}$ is directly proportional to $I_{12}$ with the slopes being equal to 0.93, 0.57, and 0.33, respectively. Simultaneously, $\hat{I}_{21}$ remained constant (FIG. 8b), with the slopes being less than $-0.004$ for the given $V_{be}$ values. $\hat{I}_{21}/\hat{I}_{12}$ equals 1.04, 0.59, and 0.33. This demonstrates that the bidirectional signals are indeed independent and the weights act symmetrically.

The bidirectional junction communication scheme is by itself also a two-input, two-output translinear circuit. The invention as described above will now be used to build additional useful circuits.

Figure 9:
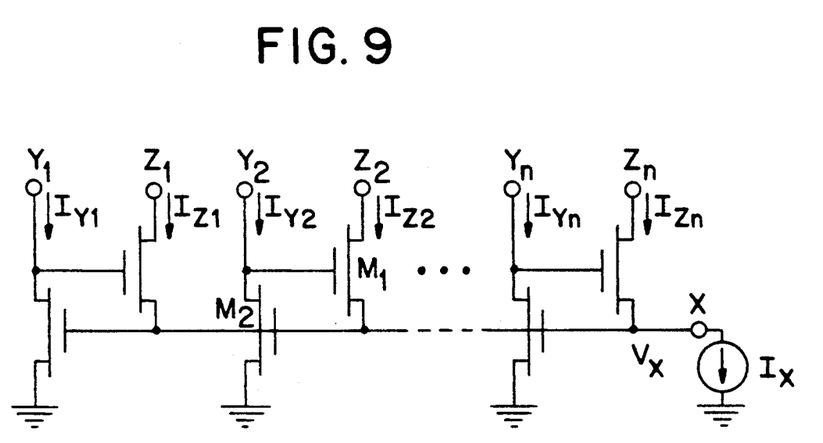
FIG. 9 illustrates a Winner-Takes-All circuit of the invention using interacting C4 circuits.

The current-mode winner-takes-all (WTA) circuit, shown in FIG. 9, is used to implement inhibitory competition between neurons. In the WTA circuit, N current-controlled current conveyors connected serially compete for a source current supplied to a common line. The current, $I_x$, is steered to the output of the conveyor with the largest input current; all other current-controlled current conveyor outputs are zero. Input currents $I_{yi}$ are supplied to the control nodes Y, output currents are obtained from the supply nodes Z, and the communication nodes X are connected together.

Each conveyor sees a voltage $V_x$, at its communication node. Consequently, for each conveyor, if $I_{yi}<g(V_x)$ (see eq. (9)), $M_2$ enters the linear region ($V_{ds}<4V_T$), turning $M_1$ off. Otherwise, $M_1$ adjusts $V_x$ to set $g(V_x)=I_y$. Thus the conveyor with the largest input sets the voltage on the common line and conveys the current $I_x$ to its supply node.

When two input currents are very similar (for instance $I_{y1} \approx I_{y2}$), the conversion from input to output is exponential. In this case, $M_2$ stays in saturation and $M_1$ remains on. $I_{y2}$ develops a voltage signal across $M_2$'s drain conductance $g_{dsat}$, which is converted exponentially to current by $M_1$, and similarly for $I_{y1}$. The sum of the output currents ($I_{z1}+I_{22}$) is equal to $I_x$. The differential gain for small signals is $$\frac{\Delta I_Z}{\Delta I_Y} = \frac{g_m}{g_{dsat}} = A \frac{I_Z}{I_Y} \quad (13)$$

where $I_{y1}=I_Y+\Delta I_Y$, $I_{y2}=I_Y-\Delta I_y$, $I_{Z1}=I_Z+\Delta I_z$, and $I_{z2}=I_z-\Delta I_2$. Hence, the small-signal differential gain is 430 for normalized inputs and outputs—a 1% input difference produces a voltage difference of 0.15 V, so the corresponding outputs differ by a factor of 75.

A pyramidal neuron circuit comprised of current-controlled current conveyors will demonstrate how complementary current-controlled current conveyors (employing n-type and p-type transistors) can be connected and how a metastability problem associated with such connection can be solved.

Cortical pyramidal neurons are arranged in layers with projections from one layer to the next. Their apical dendrites receive incoming signals while their axons carry outgoing signals. Pyramidal cell axons have collaterals that branch back and contact basal dendrites of neighboring cells; these lateral interactions are mainly inhibitory (see FIG. 10a).

Figures 10A, 10B, 11A:
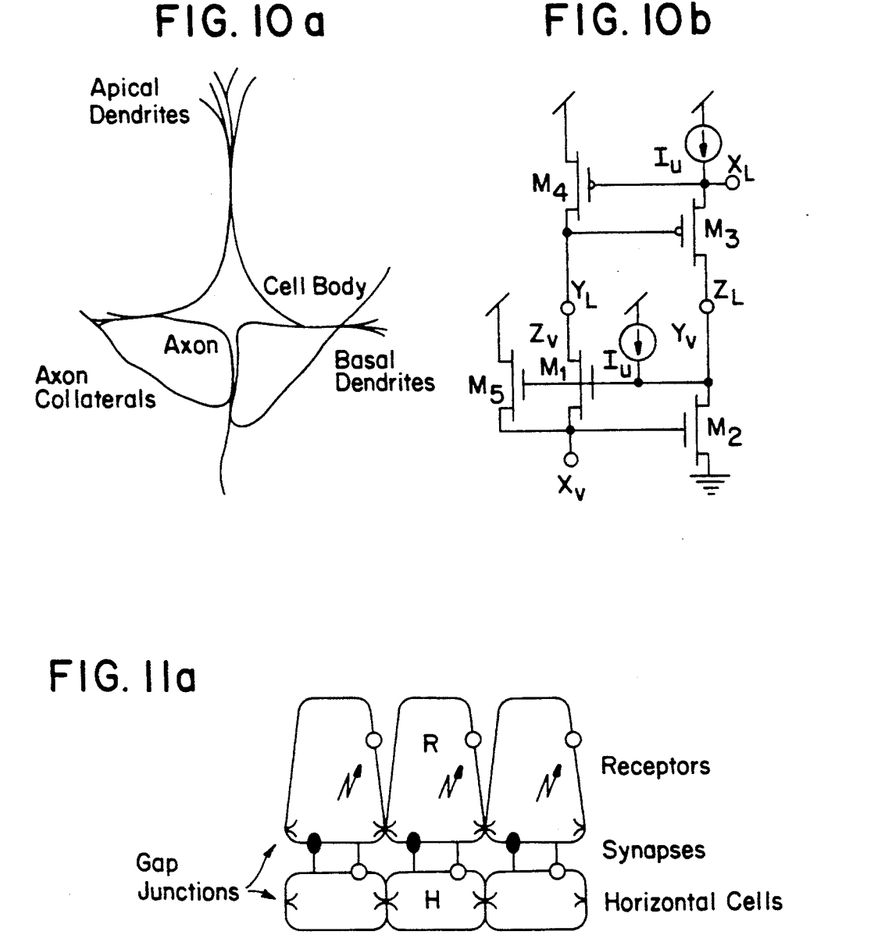
FIGS. 10a and 10b, illustrate a pyramidal neuron and an implementation thereof which is a circuit of the invention, respectively.
FIGS. 11a and 11b, illustrate cells and synapses in the outer-plexiform layer of a retina and an implementation of the outer-plexiform layer of FIG. 11a which is a circuit of the invention, respectively.

FIG. 10b shows a pyramidal cell circuit. The circuit consists of an n-type synthetic neuron ($M_1$, $M_2$), a p-type WTA cell ($M_3$, $M_4$), and an extra transistor ($M_5$) to keep the circuit in the proper mode of operation when it is first turned on. This is necessary, because when an n-type and a p-type current-controlled current conveyor feed each other, their current buffering devices ($M_1$ and $M_3$) can act as common-source amplifiers. This creates an undesirable positive feedback loop causing these devices to enter the linear region, thus driving $X_v$ and $X_L$ to the power supply rails. $M_5$ prevents this by keeping the conveyor's buffer ($M_1$) in saturation. Although $M_5$ shunts part of the incoming current, a fixed fraction of the input is always passed to the WTA cell.

The circuit has two communication nodes, $X_v$ and $X_L$. $X_v$ is analogous to both the apical dendrites and the axon of a cortical pyramidal neuron in that it carries both the incoming and outgoing excitatory signals. $X_L$ mediates lateral inhibitory interactions, mimicking the cortical cell's basal dendrites and recurrent axon collaterals.

A pyramidal neuron contributes a unit current $I_u$ to the WTA competition and also has a quiescent current of $I_u$. Therefore, its outgoing signal $g(V_{xv})$ is $I_u$ in the quiescent state but increases to $(m+1)I_u$ (where m is the number of competing cells) when it is winning (that is, when the input current at $X_v$ exceeds all other input currents).

The above-described device-level design methodology and current-domain signal representations can also be used for implementing analog VLSI silicon retinas. However, unlike the WTA and pyramidal neuron circuits for associative memory, here there is a direct analogy between the actual biological circuits and the silicon counterparts.

FIG. 11a illustrates interactions between cells in the outer-plexiform layer of a retina. No attempt is being made here to reverse-engineer the retina of any particular species; the turtle retina, though, has similar connections in the outerplexiform. This simple structure, consisting of just two types of neurons, gives the well-known center/surround receptive field. In engineering terms, this system can be thought of as a linear spatial band-pass filter, whose impulse response is the difference of two Gaussians (DOG) or the Laplacian. However, both the biological and the silicon systems are nonlinear and do much more than that.

The photoreceptors are activated by light; they produce activity in the horizontal cells through excitatory chemical synapses. The horizontal cells, in turn, suppress the activity of the receptors through inhibitory chemical synapses. The receptors and horizontal cells are electrically coupled to their neighbors by gap junctions. These electrical synapses allow ionic currents to flow from one cell to another, and are characterized by a certain conductance per unit area.

Figure 11B:
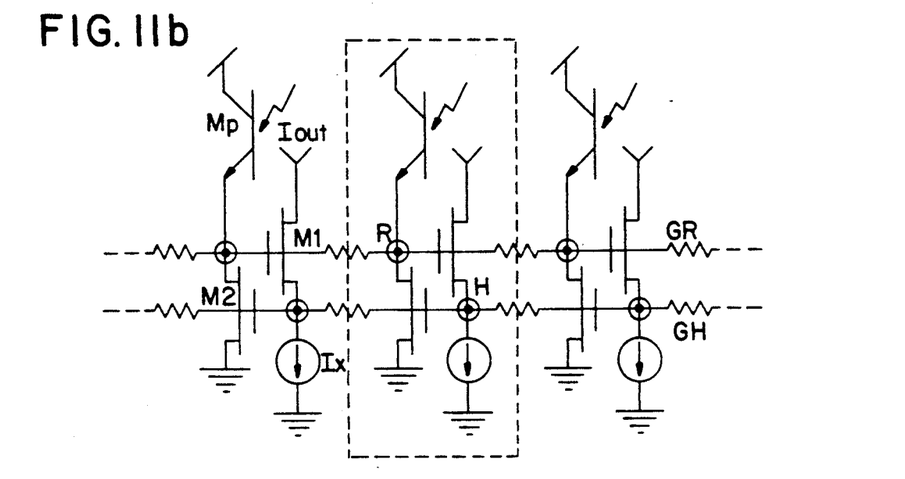

Mapping of outer-plexiform retina processing onto silicon can be done in several ways. In a design that does not employ differential voltage signals, chemical synapses may be implemented using nonlinear transconductances while gap junctions are realized using resistances (or linear or nonlinear conductances) (FIG. 11b). Nodes (equipotential regions) in the top layer correspond to receptors R while those in the lower layer represent the horizontal cells H. The two layers are coupled vertically using the two-transistor current-controlled current conveyor (C4) circuit and laterally using two resistive (or linear or nonlinear conductive) networks. A phototransistor or current source, connected to the node of the second transistor $M_2$ of the C4 circuit, is used to transduce light into current. It sources current to the receptor nodes (the $M_2$ nodes which are connected by resistors (or linear or nonlinear conductances)) while second transistor $M_2$ sinks current from those nodes; these opposing effects correspond to excitation and inhibition. First transistor $M_1$ sources current (excites) the horizontal cell nodes (the $M_1$ nodes which are connected by resistors). The bias current, $I_x$, at the source of (connected to the node of) first transistor $M_1$ sets its transconductance. For subthreshold operation, the voltages encode photocurrents logarithmically, allowing a large dynamic range.

Figure 12:
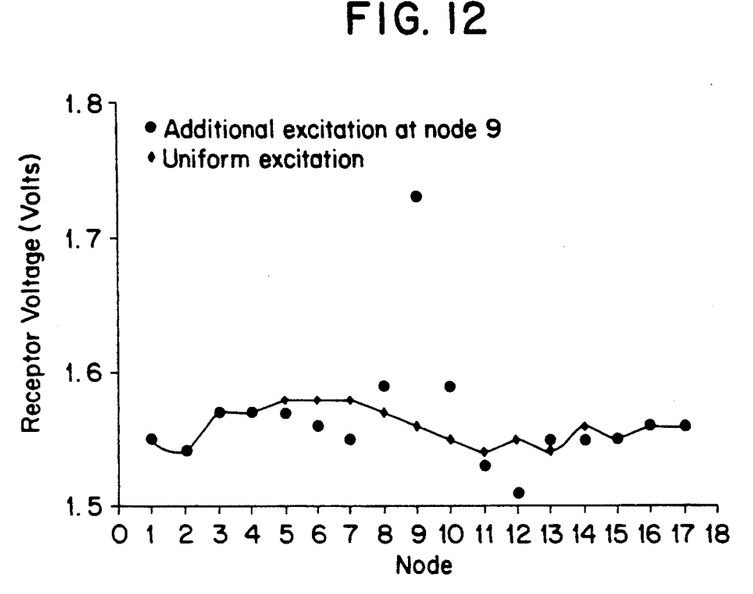
FIG. 12 illustrates experimental results from one-dimensional 1.7 node outer-plexiform silicon retina.

FIG. 12 shows experimental data from a fabricated circuit that verifies its function and robustness in individual transistor mismatch. The appearance of the on-center/off-surround organization is evident. The activation neighborhood can be controlled by adjusting the space constants to the two resistive network (conductance of gap junctions). When GR=0 (absence of gap junctions between receptors), the system looses its ability to develop a truly "Mexican-hat" response and has a local winner-takes-all behavior, i.e., activation of a single node, with a small neighborhood of inhibition.

This system is used as a front end in a number of different applications. Depending on the application, the output of the circuit can be taken from different points. For example, a current-output signal is provided at the drain of device $M_1$. This encodes the difference between the activation in the two resistive networks and is independent of the light intensity. The output of the circuit can also be taken as the voltage at the receptor terminals; this, however, provides a signal that is dependent on the absolute light intensity.

Figure 13:
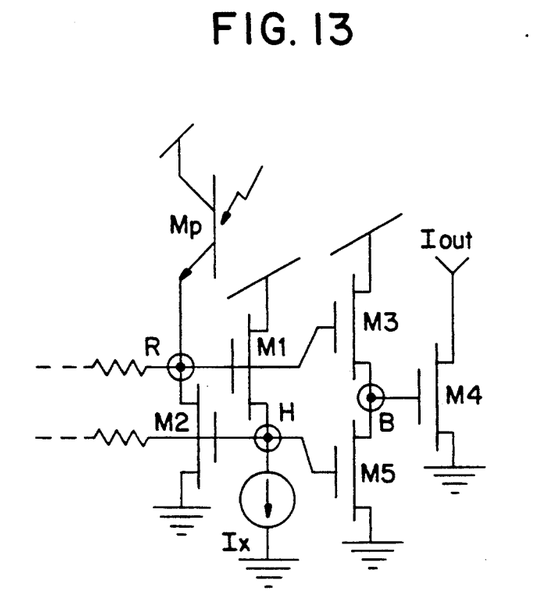
FIG. 13 illustrates an alternate output circuit of the invention that couples the outer-plexiform to other circuitry.

If a current output signal is required, it may be advantageous to use the alternative scheme (FIG. 13) that couples the outer-plexiform to other circuitry, such as inner-plexiform neurons. As shown in FIG. 13 the gate of a third transistor $M_3$ is connected to the receptor nodes while the gate of a fifth transistor $M_5$ is connected to the horizontal cell nodes. $M_3$ and $M_5$ are connected to each other and to the gate of a fourth transistor $M_4$. The above scheme provides for a better current signal and prevents undesirable interactions between two subsystems. It also demonstrates how the translinear principle is employed to convert a differential voltage signal $V_{RM}$, not referenced to the ground, to one that is referenced to ground, $V_B$. The operation of this circuit follows the discussion of the translinear multiplier/divider (see FIG. 4) above.

The two-layer retina has been used as an example of how to map biological microcircuits directly into silicon. Chemical synapses do not present a problem; they are nicely implemented with transconductances. The "Mexican-hat" response is obtained using only nearest neighbor interactions, which minimizes wiring in an analog VLSI implementation. Its response is robust over a wide range of operating conditions. The importance of this receptive field is evident from the fact that it is used in the very first brain tissue, the outer-plexiform of the retina. Similar receptive fields have been found in other parts of the brain. Through evolution, nature has discovered the simplest, most reliable, and most efficient architectures to accomplish the task at hand—properties that anyone wishing to build large-scale analog information processing systems treasures.

The invention described and claimed herein results in the following advantages:

a. Computations are carried out in the analog domain. This results in simpler, more effective, and more compact functional blocks that interact comfortably with the "real world."

b. Systems are designed with power dissipation and area efficiency as prime engineering constraints. Devices operate with current in the nA and even in the pA range. Subthreshold MOS currents are comparable to ionic currents in cell membranes. Transistors of minimum size are employed to achieve high integration density.

c. Random variations in transistor characteristics do not affect system performance. Neither accuracy nor matching are concerns in the basic elements because the inventions at both the circuit and the system level compensates for that.

d. Economic on interconnects. The biologically inspired outer-plexiform system is a good example of how complex parallel processing can be achieved through only nearest neighbor interactions.

e. Exploits the physics of basic devices. In the circuits herein, the translinear property of the subthreshold MOS transistor has been exploited for synthesis and analysis. Unlike traditional analog design, optimizing circuits by careful sizing of the devices is not necessary. This is because the transconductance is determined by the current signals and does not depend on the geometry. Longer channels are used to avoid the Early effect and large devices are employed in a few critical parts of the system to improve accuracy in the computation (current matching), for example, devices $M_2$ in the WTA circuit.

f. Local negative feedback. The current-controlled current conveyor is a circuit that depends strongly on local negative feedback for its function.

g. Current-domain signal representation. The circuits described herein employ unidirectional current signals.

We claim:

1. A circuit to fan-out a control current and, simultaneously over the same physical line, to fan-in current input signals comprising:
 a current-controlled current conveyor (C4) circuit comprising:
  a first transistor having a node for introduction of a first current and whose gate is connected to a control current; and a second transistor having a node for introduction of the control current and whose gate is connected to the first current;

wherein the first current is conveyed by the first transistor to a supply node and the control current determine the voltage at the node of the first transistor; and a plurality of transistors identical to the second transistor of the C4 circuit, the plurality of transistors each having a gate connected to the node of the first transistor of the C4 circuit;

whereby the control current is mirrored in each of the plurality of transistors.

2. A bidirectional junction circuit comprising:

a first transistor connected to a ground and to a first node at which a first voltage is applied and whose gate is connected to a second voltage; and a second transistor connected to the ground and to a second node at which the second voltage is applied and whose gate is connected to the first voltage;

wherein the first voltage is transformed into a first current at the second transistor and the second voltage is transformed into a second current at the first transistor, the first and second transistor acting as current sources when in saturation; and wherein a change in the first voltage results in a change in the first current at the second transistor and a smaller change in the second current at the first transistor and a change in the second voltage results in a change in the second current at the first transistor and a smaller change in the first current at the second transistor when the first and second transistor are in saturation; and wherein the first and second transistors are fabricated in an isolated well, and an analog signal is applied to the well to modulate multiplicatively the interaction between the first and second currents.

3. A bidirectional junction circuit comprising:

a first transistor connected to a ground and to a first node at which a first voltage is applied and whose gate is connected to a second voltage; and a second transistor connected to the ground and to a second node at which the second voltage is applied and whose gate is connected to the first voltage;

wherein the first voltage is transformed into a first current at the second transistor and the second voltage is transformed into a second current at the first transistor, the first and second transistors acting as current sources when in saturation; and wherein when a power supply voltage is applied at the ground and the first voltage is greater than the second voltage, the first transistor is turned off and the second transistor sources the current.

4. A current-mode winner-takes-all circuit connected to a source current comprising a plurality of current-controlled current conveyor (C4) circuits, each of the C4 circuits comprising:

a first transistor having a node for introduction of a first current and whose gate is connected to a control current; and a second transistor having a node for introduction of the control current and whose gate is connected to the first current;

wherein the first current is conveyed by the first transistor to a supply node and the control current determines the voltage at the node of the first transistor, the plurality of C4 circuits being connected serially to each other and to the source current on a common line, wherein the C4 circuit with the largest control current input conveys the source current to its supply node and all other C4 circuit outputs are zero.

5. The winner-takes-all circuit as recited in claim 4, wherein, when two control current inputs are similar, the conversion from input to output is exponential and the sum of the currents at the supply nodes equals the source current.

6. The circuit as recited in claim 4, further comprising:

a third transistor whose gate is connected to the nodes of the second transistors of the C4 circuits;

a fourth transistor whose gate is connected to the third transistor; and a fifth transistor whose gate is connected to the nodes of the first transistors of the C4 circuits, the fifth transistor also being connected to the third transistor and to the gate of the fourth transistor.

7. A pyramidal neuron circuit comprising:

an n-type current-controlled current conveyor (C4) circuit, the C4 circuit comprising:

a first transistor having a node for introduction of a first current and whose gate is connected to a control current; and a second transistor having a node for introduction of the control current and whose gate is connected to the first current;

wherein the first current is conveyed by the first transistor to a supply node and the control current determines the voltage at the node of the first transistor;

a p-type C4 circuit whose control current and supply nodes are connected, respectively, to the supply and control current nodes of the n-type C4 circuit;

a single transistor connected to the node of the first transistor of the n-type C4 circuit and the gate of the single transistor being connected to the gate of the first transistor and to the control node of the n-type C4 circuit; and two communication nodes, one at the node of the first transistor of the n-type C4 circuit and one at the node of the first transistor of the p-type C4 circuit.

8. A circuit for simulating the interactions between cells in the outer-plexiform layer of a retina comprising:

at least two current-controlled current conveyor (C4) circuits each of the C4 circuits comprising:

a first transistor having a node for introduction of a first current and whose gate is connected to a control current; and a second transistor having a node for introduction of the control current and whose gate is connected to the first current;

wherein the first current is conveyed by the first transistor to a supply node and the control current determines the voltage at the node of the first transistor, the node of the first transistor in each C4 circuit being connected to a bias current source;

two conductances, one conductance connecting the nodes of the first transistors of the C4 circuit and the other conductance connecting the nodes of the second transistors of the C4 circuits; and two phototransistors, each being connected to the node of the second transistor of one of the C4 circuits.

* * * * *